United States Patent [19]

Okayama et al.

[11] Patent Number: 5,388,001
[45] Date of Patent: Feb. 7, 1995

[54] POLARIZATION-INDEPENDENT OPTICAL WAVELENGTH FILTER WITH SIMPLIFIED STRUCTURE

[75] Inventors: Hideaki Okayama; Issei Asabayashi; Masao Kobayashi, all of Tokyo, Japan

[73] Assignee: Oki Electric Industry Co., Ltd., Tokyo, Japan

[21] Appl. No.: 128,036

[22] Filed: Sep. 29, 1993

[30] Foreign Application Priority Data

Oct. 7, 1992 [JP] Japan .................. 4-268264
Sep. 17, 1993 [JP] Japan .................. 5-231541

[51] Int. Cl.⁶ .............. G02B 27/14; G02B 6/00; G02B 6/10; H01S 3/30
[52] U.S. Cl. ...................... 359/629; 385/4; 356/350; 372/6
[58] Field of Search ............. 372/4, 6, 7; 385/4, 385/8, 11, 27, 122, 24; 256/350, 351, 352; 359/629

[56] References Cited

U.S. PATENT DOCUMENTS

| | | | |
|---|---|---|---|
| 4,273,411 | 6/1981 | Alferness | 385/400 |
| 4,390,236 | 6/1983 | Alferness | 385/9 |
| 5,090,017 | 2/1992 | Mendenhall et al. | 385/122 X |
| 5,230,029 | 7/1993 | Mendenhall et al. | 385/27 |
| 5,327,276 | 7/1994 | Shimosaka et al. | 359/125 |

FOREIGN PATENT DOCUMENTS 2-84621 3/1990 Japan .
5-88116 4/1993 Japan .

OTHER PUBLICATIONS

Cheung et al., "1 Gb/s System Performance of an Integrated, Polarization–Independent, Accoustically–Tunable Optical Filter", IEEE Photonics Technology Letters, vol., 2, No. 4, Apr. 1990, pp. 271–273.

Fukutoku et al., "Wavelength–Division–Multiplexing Add/Drop Multiplexer Employing A Novel Polarisation Independent Accusto–Optic Tunable Filter", Electronics Letters, vol. 29, No. 10, May 13, 1993, pp. 905–907.

*Primary Examiner*—Akm E. Ullah
*Attorney, Agent, or Firm*—Steven M. Rabin

[57] ABSTRACT

A polarization-independent optical wavelength filter uses a polarization splitter to divide an optical input signal into first and second signals with mutually perpendicular planes of polarization. The first signal propagates via a first optical path to a first end of an optical device, such as a TE-TM mode converter or a polarization-dependent filter, that acts selectively on the desired wavelength, then returns via a second optical path from a second end of the optical device to the polarization splitter. The second signal propagates via the second optical path to the second end of the same optical device, and returns from the first end via the first optical path to the polarization splitter. The polarization splitter recombines the returning signals into an optical output signal consisting only of the desired wavelength.

34 Claims, 7 Drawing Sheets

POLARIZATION-INDEPENDENT OPTICAL WAVELENGTH FILTER WITH SIMPLIFIED STRUCTURE

BACKGROUND OF THE INVENTION

This invention relates to a polarization-independent optical wavelength filter having a simplified two-stage structure.

Optical wavelength filters have been developed for use in wavelength-division-multiplexed lightwave communication systems, to select a desired signal channel having a certain wavelength while rejecting other channels of different wavelengths. One conventional filter design employs a TE-TM mode converter disposed between crossed polarizers. This type of filter combines sharp wavelength selectivity with low loss, but it restricts the optical input signal to a specific state of polarization, a restriction which is extremely inconvenient in lightwave communications.

To overcome this restriction, various polarization-independent designs have been proposed. One design, described in Japanese Patent Kokai Publication 84621/1990, divides the input signal into two halves which are red through two parallel polarization-dependent wavelength filters, one transmitting a specific wavelength of the TE component, the other transmitting the same wavelength of the TM component. The emerging signals are recombined to obtain the output signal. Aside from requiring two wavelength Filters, this design has the disadvantage of losing half of the desired signal.

Another design, described in the same source employs one polarization-dependent wavelength filter and rotates the plane of polarization of the input signal through a variable angle, the angle being varied cyclically at a rate higher than the signaling care. This design also has the disadvantage of losing half of the desired signal.

Yet another design, disclosed by the present inventors in Japanese Patent Kokai Publication 169603/1991, uses a first polarization splitter to divide the input signal into two linearly-polarized components, which are rotated so that their planes of polarization coincide. These components are coupled to opposite ends of a polarization-dependent filter that separates the desired wavelength. The emerging signals are again rotated, then coupled to a second polarization splitter that recombines them into an output signal. This design avoids the large loss associated with the two preceding designs, but is structurally complex.

SUMMARY OF THE INVENTION

It is accordingly an object of the present invention to simplify the structure of a polarization-independent optical wavelength filter.

Another object is to improve the extinction ratio of a polarization-independent optical wavelength filter.

The invented polarization-independent optical wavelength filter uses a polarization splitter to divide an optical input signal into a first signal and a second signal. The first signal and second signal are linearly polarized and have mutually perpendicular planes of polarization.

The first signal is led via a first optical path to a first end of an optical device that acts selectively on the desired wavelength. The second signal is led via a second optical path to a second end of the same optical device. The optical device transmits the first signal from the first end to the second end, thereby creating a first returning signal, and transmits the second signal from the second end to the first end, thereby creating a second returning signal.

The First returning signal returns to the polarization splitter via the second optical path. The second returning signal returns to the polarization splitter via the first optical path. The polarization splitter recombines the first and second returning signals, thereby generating an optical output signal.

The optical device may be a TE-TM mode converter, or a polarization-dependent optical wavelength filter.

DETAILED DESCRIPTION OF THE INVENTION

Several embodiments of the invention will be described with reference to the attached drawings. These drawings illustrate the invention but do not restrict its scope, which should be determined solely from the appended claims.

Figure 1:
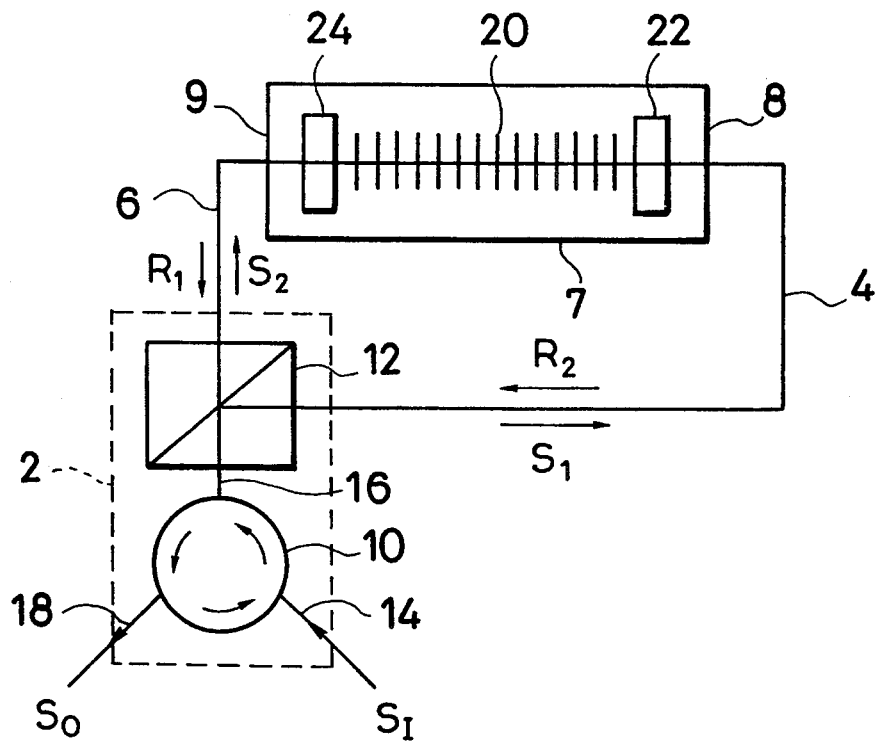
FIG. 1 is a schematic diagram of a first novel polarization-independent optical wavelength filter.

Referring to FIG. 1, a first polarization-independent optical wavelength filter comprises an input-output section 2, a first optical path 4, a second optical path 6, and an integrated optical device 7. The first optical path 4 couples the input-output section 2 to a first end 8 of the integrated optical device 7. The second optical path 6 couples the input-output section 2 to a second end 9 of the integrated optical device 7.

Figure 2:
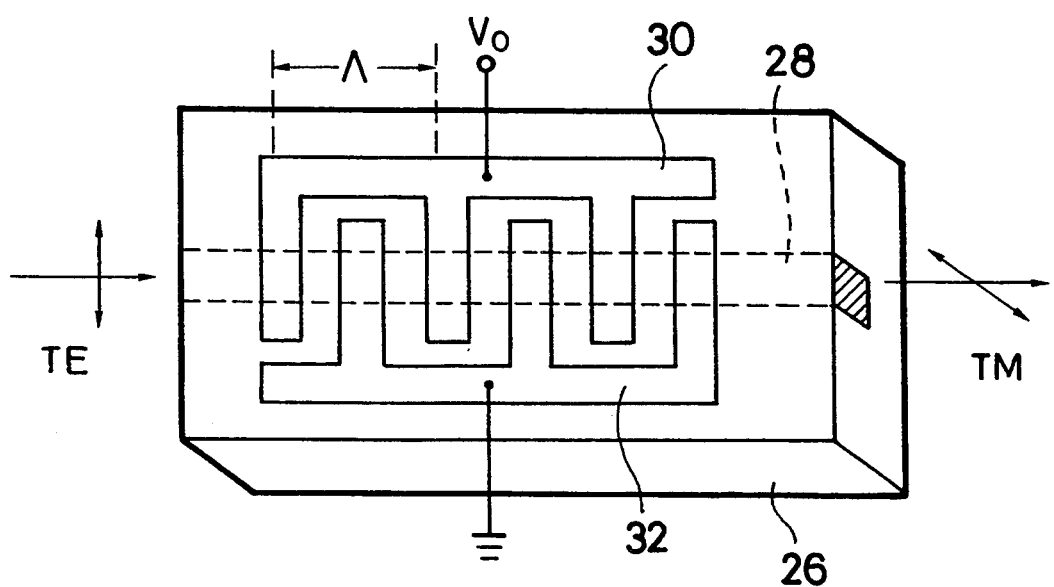
FIG. 2 is a perspective drawing of the TE-TM mode converter in FIG. 1.

The input-output section 2 comprises an optical gyrator and a polarization splitter. The optical gyrator in FIG. 2 is an optical circulator 10. The polarization splitter is a polarizing beam-splitter 12.

An optical gyrator is a non-reciprocal optical device having two or more ports between which light travels on non-reversible paths. The optical circulator 10 in FIG. 2 has three ports: an input port 14, an intermediate port 16 that couples the optical circulator 10 to the polarizing beam-splitter 12, and an output port 18. Light entering the optical circulator 10 at the input port 14 exits at the intermediate port 16; light entering at the intermediate port 16 exits at the output port 18; and if light were enter at the output port 18, it would exit at the input port, 14.

The polarizing beam-splitter 12 splits light received from the intermediate port 16 into two linearly-polarized optical signals: a first signal $S_1$ which it feeds into the first optical path 4, and a second signal, $S_2$ which it feeds into the second optical path 6. The planes of polarization of these two signals are mutually perpendicular. The first signal $S_1$ is polarized so that its magnetic field vibrates in the plane of the page in FIG. 1 and its electric field vibrates perpendicular to the page; this polarization mode will be referred to as the transverse magnetic (TM) mode. The second signal $S_2$ is polarized so that its electric field vibrates in the plane of the page and its magnetic field vibrates perpendicular to the page; this polarization will be referred to as the transverse electric (TE) mode.

The polarizing beam-splitter 12 operates by transmitting light polarized in the TE mode straight through and reflecting light polarized in the TM mode at ninety-degree angle. These transmission and reflection paths are reversible, so the polarizing beam-splitter 12 can recombine returning signals, as will be explained later.

The first optical path 4 and second optical path comprise, for example, polarization-maintaining optical fiber that preserves the states of polarization of in transit.

Optical circulators, polarizing beam-splitters, and polarization-maintaining optical fiber are well-known items that are commercially available, so a detailed description of their structure will be omitted.

The integrated optical device 7 comprises a TE-TM mode converter 20 disposed between a pair of crossed polarizers 22 and 24. The polarizer 22 at the first end 8 is oriented so as to transmit light polarized in the TM mode and block light polarized in the TE mode. The polarizer 24 at the second end 9 of the device 7 is oriented so as to transmit TE-polarized light and block TM-polarized light.

FIG. 2 shows the TE-TM mode converter 20 in more detail. The TE-TM mode converter 20 (and the integrated optical device 7 as a whole) is formed on a lithium niobate (LiNbO$_3$) substrate 26 provided with a waveguide 28. Because of the optical anisotropicity of LiNbO$_3$, the TE and TM modes propagate along the waveguide 28 with different effective indices or refraction. An electro-optic grating is created by a pair of interdigital electrodes 30 and 32 formed over the waveguide 28. A voltage $V_0$ applied to electrode 30 while electrode 32 is grounded sets up an electric field that varies periodically with period $\Lambda$ in the longitudinal direction of the waveguide 28.

Due to well-known electro-optical effects, if light propagating along the waveguide 28 has a wavelength equal to $\Lambda$ multiplied by the difference between the effective TE and TM refractive indices, TE vibration will be converted to TM vibration and vice versa. For example, light of this wavelength entering the waveguide 28 from the left in the drawing, polarized in the plane of the substrate 26 as indicated by the double arrow marked TE, will be polarized perpendicular to the substrate 26 when it emerges at the right, as indicated by the arrow marked TM. Light of other wavelengths will not be affected.

If $\zeta$ is 18 μm and the difference in effective indices of refraction is approximately 0.072, the TE-TM mode converter 20 will act selectively on light having a wavelength $\lambda$ of 1.3 μm, converting between the TE and TM modes at this wavelength but not at other wavelengths.

Next the operation of the optical wavelength filter in FIG. 1 will be described.

An optical input signal $S_I$ enters the input-output section 2 at the input port 14 and is routed from the optical circulator 10 via the intermediate port 16 to the polarizing beam-splitter 12. The input signal $S_I$ comprises various wavelengths, one of which is the wavelength $\lambda$ acted on selectively by the TE-TM mode converter 20. The polarizing beam-splitter 12 splits all wavelengths of the input signal $S_I$ into a TM-polarized first signal $S_1$ and a TE-polarized second signal $S_2$.

The first signal $S_1$ is carried by the first optical path 4 to the first end 8 of the integrated optical device 7, where it passes the TM-transmitting polarizer 22 and enters the TE-TM mode converter 20. The TE-TM mode converter 20 converts the $\lambda$ wavelength component of the first signal $S_1$ from the TM mode to the TE mode, in effect rotating its plane of polarization by ninety degrees. The $\lambda$ component accordingly passes through the TE-transmitting polarizer 24 at the second end 9 of the integrated optical device 7 to emerge as a first returning signal $R_1$. Other wavelengths of the first signal $S_1$ are not rotated, so they are blocked by the TE-transmitting polarizer 24.

Similarly, the second signal $S_2$ is carried by the second optical path 6 to the second end 9 of the integrated optical device 7 and passes through the TE-transmitting polarizer 24 into the TE-TM mode converter 20. Its $\lambda$ wavelength component is rotated by ninety degrees and exits through the TM-transmitting polarizer 22 at the First end 8 to become a second returning signal $R_2$. Other wavelengths are not rotated, so they are blocked by the TM-transmitting polarizer 22.

The first returning signal $R_1$ returns via the second optical path 6 to the polarizing beam-splitter 12 where, being TE-polarized, it is transmitted straight through to the intermediate port 16. The second returning signal $R_2$ returns via the first optical path 4 to the polarizing beam-splitter 12 where, being TM-polarized, it is reflected at a ninety-degree angle to the intermediate port 16. The polarizing beam-splitter 12 thereby recombines the first and second returning signals $R_1$ and $R_2$ into a single optical output signal $S_0$ that enters the optical circulator 10 from the intermediate port 16 and exits at the output port 18.

None of the optical elements in FIG. 1 block the $\lambda$ wavelength component at any point, so the novel filter is able to deliver substantially the entire $\lambda$ component from the optical input signal $S_I$ to the optical output signal $S_0$. Moreover, the filter has a simple, two-stage structure consisting of a single input-output section 2 and a single integrated optical device 7. This wavelength filter accordingly combines low loss with the advantage of structural simplicity.

By blocking wavelengths other than $\lambda$, the polarizers 22 and 24 improve the extinction ratio of the filter, the extinction ratio being the ratio of the intensity of undesired wavelengths in the optical output signal $S_0$ to the intensity at the desired wavelength $\lambda$. In wavelength-division-multiplexed optical communications, this has the effect of reducing inter-channel crosstalk.

The polarizers 22 and 24 are not necessary to the operation of the filter, however. If they are omitted, undesired wavelengths in the first returning signal $R_1$, being TM-polarized, will be reflected at a ninety-degree angle in the polarizing beam-splitter 12, while undesired wavelengths in the second returning signal $R_2$, being TE-polarized, will be transmitted straight through. Unwanted wavelengths in both returning signals $R_1$ and $R_2$ will therefore exit from the left side of the polarizing beam-splitter 12 in the drawing, instead of entering the intermediate port 16. The optical output signal $S_0$ will, accordingly, still be substantially free of undesired wavelengths.

Figure 3:
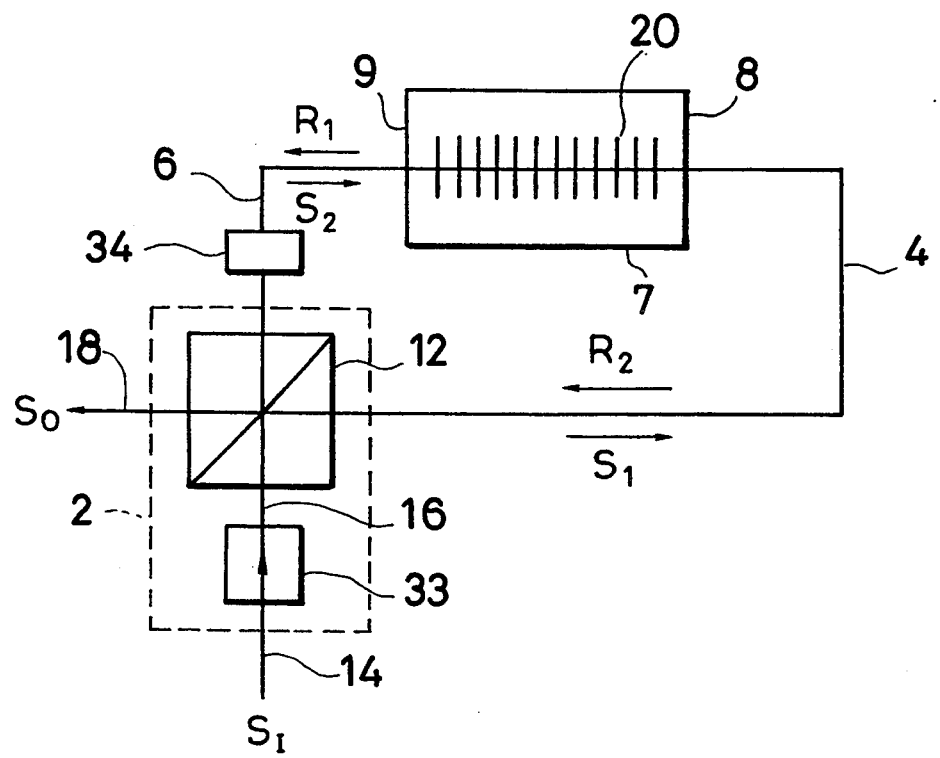
FIG. 3 is a schematic diagram of a second novel polarization-independent optical wavelength filter.

FIG. 3 shows a second novel polarization-independent optical wavelength filter. Elements common to FIG. 1 have the same reference numerals; detailed descriptions of these elements will be omitted.

As its optical gyrator, the input-output section 2 in FIG. 3 has an optical isolator 33. An optical isolator is a device with two ports, in this case the input port, 14 and the intermediate port 16. Light entering the input port 14 is transmitted to the intermediate port 16. Light entering the intermediate port 16, however, is dissipated within the optical isolator 33 and is not transmitted to the input port 14. The output port 18 of the input-output section 2 is now located on the left side of the polarizing beam-splitter 12 in FIG. 3.

The integrated optical device 7 in FIG. 3 is identical to the integrated optical device 7 in FIG. 1 except that the polarizers 22 and 24 have been removed.

The optical paths 4 and 6 are as in FIG. 1 except that a ninety-degree optical rotator 34 has been inserted in the second optical path 6. The ninety-degree optical rotator 34 transmits all incident light, but rotates the plane of polarization of the, light by ninety degrees. The ninety-degree optical rotator 34 is, for example, simply a section of fiber in the optical path 6 that is twisted ninety degrees about its long axis.

Next the operation of the filter in FIG. 3 will be described.

The optical input signal $S_I$ enters the input-output section 2 through the input port 14, is transmitted by the optical isolator 33 to the polarizing beam-splitter 12, and splits into first and second signals $S_1$ and $S_2$ as in FIG. 1. The plane of polarization of the second signal $S_2$, however, is rotated through ninety degrees by the optical rotator 34, so that both the first signal $S_1$ and second signal $S_2$ enter the TE-TM mode converter 20 as TM signals, their electric fields vibrating perpendicular to the page. The TE-TM mode converter 20 converts the $\lambda$ wavelength component of both signals from the TM mode to the TE mode, other wavelength components being left in the TM mode.

The second returning signal $R_2$ returns to the polarizing beam-splitter 12 in this polarization state, so its $\lambda$ wavelength component is transmitted straight through the polarizing beam-splitter 12 to the output port 18. Other wavelengths, being polarized in the TM mode, are reflected to the intermediate port 16 and blocked in the optical isolator 33.

The first returning signal $R_1$ is rotated through ninety degrees by the optical rotator 34 on the second optical path 6, so its $\lambda$ wavelength component arrives polarized in the TM mode while other wavelengths are polarized in the TE mode. The $\lambda$ wavelength component is accordingly reflected to the output port 18, while other components pass through to the intermediate port 16 and are blocked in the optical isolator 33.

The polarizing beam-splitter 12 thereby recombines the $\lambda$ wavelength components of the first and second returning signals $R_1$ and $R_2$ into an optical output signal $S_0$ which exits from the output port 18, while other wavelengths are diverted to the optical isolator 33 and extinguished.

The filter in FIG. 3 offers the same advantages of low loss and a simple, two-stage structure as the filter in FIG. 1.

Figure 4:
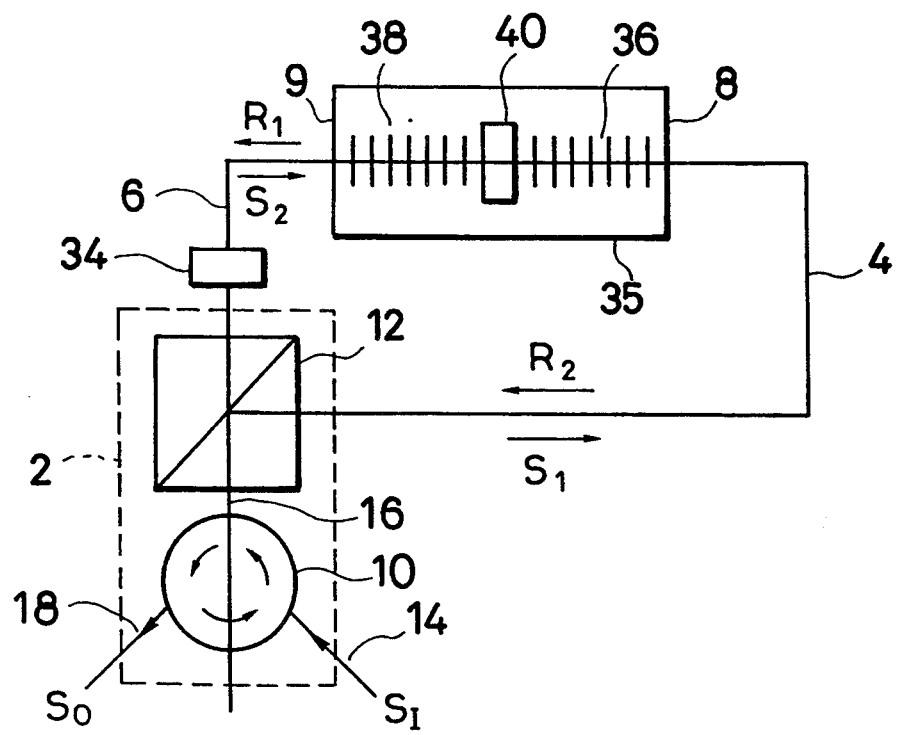
FIG. 4 is a schematic diagram of a third novel polarization-independent optical wavelength filter.

FIG. 4 shows a third novel polarization-independent optical wavelength filter. Elements common to FIGS. 1 and 3 have the same reference numerals, and detailed descriptions will be omitted.

The input-output section 2 in FIG. 4 comprises a optical circulator 10 and polarizing beam-splitter 12 as in FIG. 1. The first optical path 4 and second optical path 6 are as in FIG. 3, with a ninety-degree optical rotator 34 inserted in the second optical path 6.

The integrated optical device in FIG. 4 is a polarization-dependent optical wavelength filter 35 comprising two TE-TM mode converters 36 and 38 of the type shown in FIG. 2, with a TE-transmitting polarizer 40 disposed between them. This polarization-dependent optical wavelength filter 35 is designed to filter TM-polarized light. If such light enters at the first end 8, the $\lambda$ wavelength component will be converted by the TE-TM mode converter 36 to the TE mode, pass through the TE-transmitting polarizer 40, be converted by the TE-TM mode converter 38 back to the TM mode, and exit from the second end 9. Other wavelength components will not be converted, so they will be blocked at the TE-transmitting polarizer 40. TM-polarized light entering at the second end 9 will be similarly filtered, the $\lambda$ wavelength component emerging in the TM polarization state at the first end 8.

Next the operation of this filter will be described. The optical input signal $S_I$ entering at the input port 14 is split by the polarizing beam-splitter 12 into a TM-polarized first signal $S_1$ and a TE-polarized second signal $S_2$. The ninety-degree optical rotator 34 rotates the plane of polarization of the second signal $S_2$ so that both signals $S_1$ and $S_2$ enter the polarization-dependent optical wavelength filter 35 in the TM polarization state. Accordingly, their $\lambda$ wavelength components emerge as the first and second returning signals $R_1$ and $R_2$, other wavelengths being blocked by the TE-transmitting polarizer 40 as described above. The ninety-degree optical rotator 34 rotates the first returning signal $R_1$ so that it reaches the polarizing beam-splitter 12 in the TE polarization state, while the second returning signal $R_2$ remains in the TM state. The polarizing beam-spitter 12 recombines $R_1$ and $R_2$ as in FIG. 1 to produce an optical output signal $S_0$ containing only the $\lambda$ wavelength component of the input signal $S_I$.

An advantage of the filter in FIG. 4 is that its two TE-TM mode converters 36 and 38 give it a higher extinction ratio than filters employing only a single TE-TM mode converter. Consider, for example, a wavelength $\lambda + \delta$ close enough to $\lambda$ to be ten-percent converted by the TE-TM mode converters 36 and 38. Ten percent of the light at this wavelength will pass the TE-transmitting polarizer 40, but only one percent will return to the polarizing beam-splitter 12 with the state of polarization needed to reach the optical circulator 10. The extinction ratio at this wavelength is accordingly improved by a factor of ten. This same advantage applies to the filters to be shown in FIGS. 5, 11, and 14.

Figure 5:
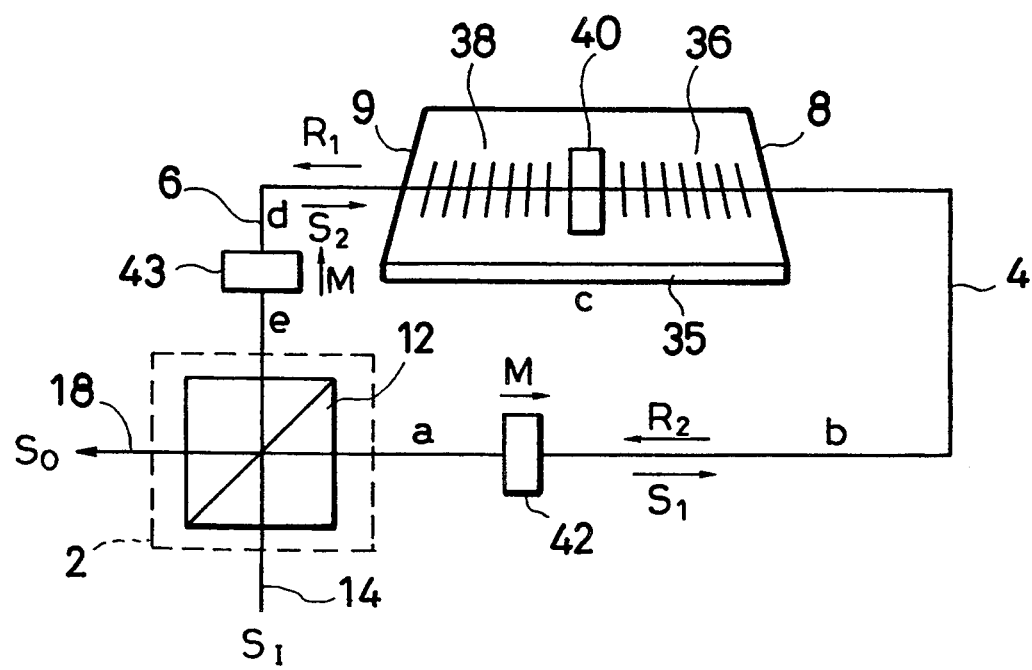
FIG. 5 is a schematic diagram of a fourth novel polarization-independent optical wavelength filter.

FIG. 5 illustrates a fourth novel polarization-independent optical wavelength filter. Elements common to FIGS. 3 and 4 have the same reference numerals, and detailed descriptions will be omitted.

The input-output section 2 in FIG. 5 comprises the polarizing beam-spitter 12, which receives the optical input signal $S_I$ from the input port 14 and provides the optical output signal $S_O$ to the output port 18. The input and output ports 14 and 18 are disposed as in FIG. 3, but the optical isolator 33 and intermediate port 16 of FIG. 3 are omitted. The polarization-dependent optical wavelength filter 35 is the same as in FIG. 4, except that it is tilted at a forty-five-degree angle with respect to the plane of the page, the lower edge of the filter 35 in FIG. 5 being tilted up from the page and the upper edge being tilted down.

A pair of forty-five-degree Faraday rotators 42 and 43 are inserted in the first and second optical paths 4 and 6 in FIG. 5. A Faraday rotator is a non-reciprocal device comprising, for example, a light-transmitting magnetic material that is magnetized in a direction parallel to the direction of light transmission. In FIG. 5 the magnetic field vectors, marked with the letter M, point in the direction away from the input-output section 2. The well-known Faraday effect causes the plane of polarization of light traveling in the direction of the magnetic field vector M to rotate clockwise, and the plane of polarization of light traveling in the opposite direction to rotate counterclockwise, clockwise and counterclockwise being as seen when looking in the direction of propagation of the light. The length and magnetic field strength of the Faraday rotators 42 and 43 in FIG. 5 are adjusted so that the angle of rotation is forty-five degrees.

Next the operation will be described with reference to FIGS. 6 and 7, which show the planes of polarization of the first and second signals $S_1$ and $S_2$ and their returning signals $R_1$ and $R_2$ at points 'a,' 'b,' 'c,' 'd,' and 'e' in FIG. 5, as seen by an observer looking in the direction of propagation of the light.

The first signal $S_1$ leaves the polarizing beam-splitter 12 and passes point 'a' in FIG. 5 polarized in the TM mode, its electric field vibrating perpendicular to the page. This is indicated by a vertical arrow under the letter 'a' in FIG. 6. Passage through the Faraday rotator 42 rotates the plane of polarization clockwise through forty-five degrees, as indicated under 'b' in FIG. 6. The first signal $S_1$ accordingly enters the polarization-dependent optical wavelength filter 35 as a TM signal, its electric field vibrating perpendicular to the substrate plane of the polarization-dependent optical wavelength filter 35, which is tilted forty-five degrees with respect to the page.

Figure 6:
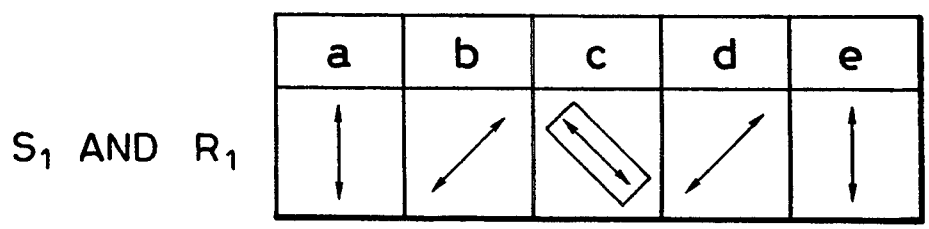
FIG. 6 illustrates planes of polarization at various points in FIG. 5.

The TE-TM mode converter 36 in FIG. 5 converts the λ wavelength component of the first signal $S_1$ from the TM to the TE mode, rotating its plane of polarization through ninety degrees as indicated under 'c' in FIG. 6. The electric field of this component now vibrates in the substrate plane of the polarization-dependent optical wavelength filter 35, indicated by the rectangle under 'c' in FIG. 6. The λ wavelength component therefore passes through the TE-transmitting polarizer 40 in FIG. 5, while other wavelength components, which still vibrate in the TM mode, are blocked.

The TE-TM mode converter 38 rotates the plane of polarization of the λ wavelength component by ninety degrees again, as indicated under 'd' in FIG. 6. At this point the signal has become the first returning signal $R_1$. On passage through the Faraday rotator 43, since its direction of propagation is opposite to the magnetic field vector M, the first returning signal $R_1$ is rotated forty-five degrees counterclockwise, as indicated under 'e' in FIG. 6. The first returning signal $R_1$ accordingly enters the polarizing beam-splitter 12 with the same state of polarization (at 'e') as when the first signal $S_1$ left the polarizing beam-splitter 12 (at 'a'). $R_1$ is therefore reflected to the output port 18 in FIG. 5.

Figure 7:
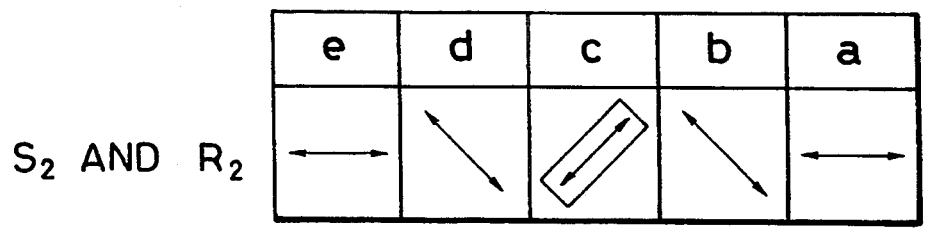
FIG. 7 likewise illustrates planes of polarization at various points in FIG. 5.

The situation in FIG. 7 is similar. The second signal $S_2$ leaves the polarizing beam-splitter 12 at point 'e' with its electric field vibrating in the plane of the page in FIG. 5, as indicated by the horizontal arrow under the letter 'e' in FIG. 7. The Faraday rotator 43 rotates this plane of polarization forty-five degrees clockwise, as indicated under 'd.' As seen in the direction of propagation of the second signal $S_2$, the polarization-dependent optical wavelength filter 35 is tilted as shown under 'c,' so the second signal $S_2$ enters the polarization-dependent optical wavelength filter 35 as a TM signal. The TE-TM mode converter 38 converts the λ wavelength component to the TE mode, so this wavelength passes the TE-transmitting polarizer 40 while other wavelengths are blocked. The TE-TM mode converter 36 converts the mode back to TE, so that the second returning signal $R_2$ at point 'b' has the indicated polarization. On passage through the Faraday rotator 42 the second returning signal $R_2$ is traveling opposite to the magnetic field vector M, so it is rotated forty-five degrees counterclockwise and regains the same state of polarization at point 'a' as the second signal $S_2$ had originally at point 'e.' The second returning signal $R_2$ accordingly passes straight through the polarizing beam-splitter 12 to the output port 18.

Although the Faraday rotators 42 and 43 have been described as rotating the outgoing signals $S_1$ and $S_2$ clockwise and the returning signals $R_1$ and $R_2$ counterclockwise, to an observer at the input-output section 2, all these rotations would appear to be clockwise. This is because such an observer views the outgoing signals $S_1$ and $S_2$ in their direction of propagation, but views the returning signals $R_1$, and $R_2$ opposite to their direction of propagation. The action of the Faraday rotators 42 and 43 can therefore be described simply by saying that they rotate all signals clockwise as seen from the input-output section 2.

Figure 8:
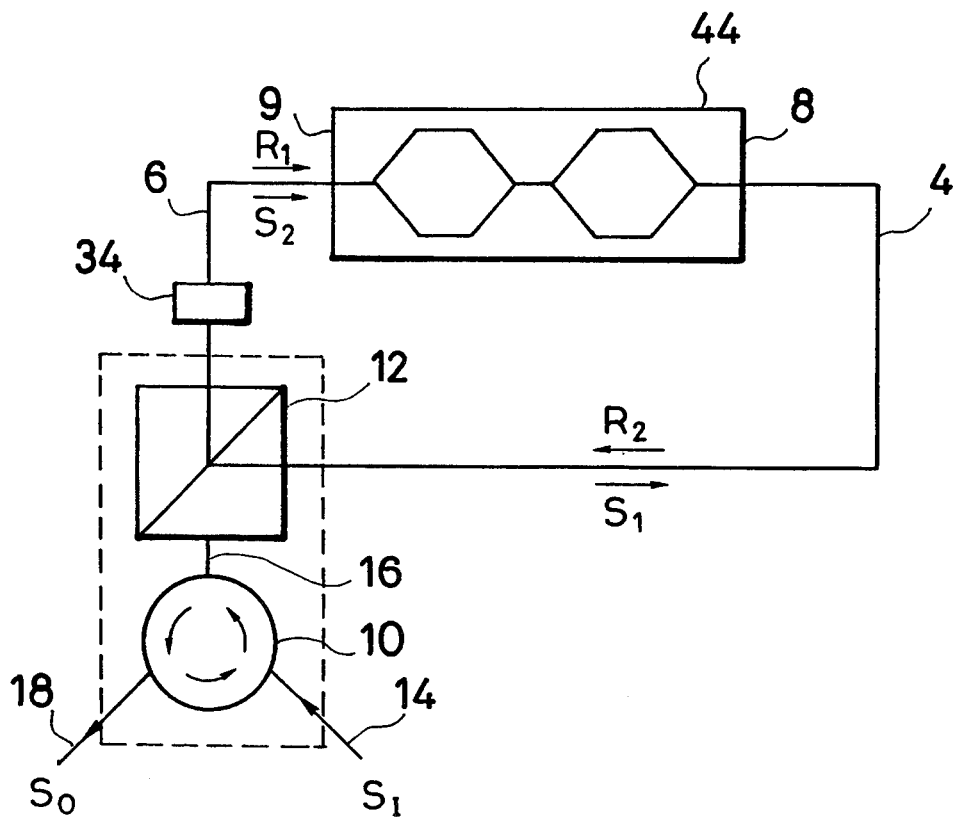
FIG. 8 is a schematic diagram of a fifth novel polarization-independent optical wavelength filter.

FIG. 8 shows a fifth novel polarization-independent optical wavelength filter. Elements common to FIG. 4 have the same reference numerals; detailed descriptions will be omitted.

The polarization-dependent optical wavelength filter in FIG. 8 is a Mach-Zehnder filter 44, a more detailed description of which will be given later. The property of interest here is that when presented with a TM-mode signal at either end 8 or 9, the Mach-Zehnder filter 44 selects a certain wavelength λ, which it transmits to the other end 9 or 8, and rejects other wavelengths.

The filter in FIG. 8 accordingly operates in the same way as the filter in FIG. 4. The first signal $S_1$ enters the first end 8 of the Mach-Zehnder filter 44 polarized in the TM mode; the λ wavelength component exits at the second end 9 as the first returning signal $R_1$, still polarized in the TM mode; the ninety-degree optical rotator 34 rotates the plane of polarization to the TE state, so that the first returning signal $R_1$ passes through the polarizing beam-splitter 12 to the optical circulator 10.

Similarly, the second signal $S_2$ leaves the polarizing beam-splitter 12 polarized in the TE mode, is rotated by the ninety-degree optical rotator 84, enters the polarization-dependent optical wavelength filter 35 polarized in the TM mode, and is filtered as described above. The λ wavelength component that emerges at the first end 8 as the second returning signal $R_2$, being polarized in the TM mode, is reflected by the polarizing beam-splitter 12 to the optical circulator 10.

Figure 9:
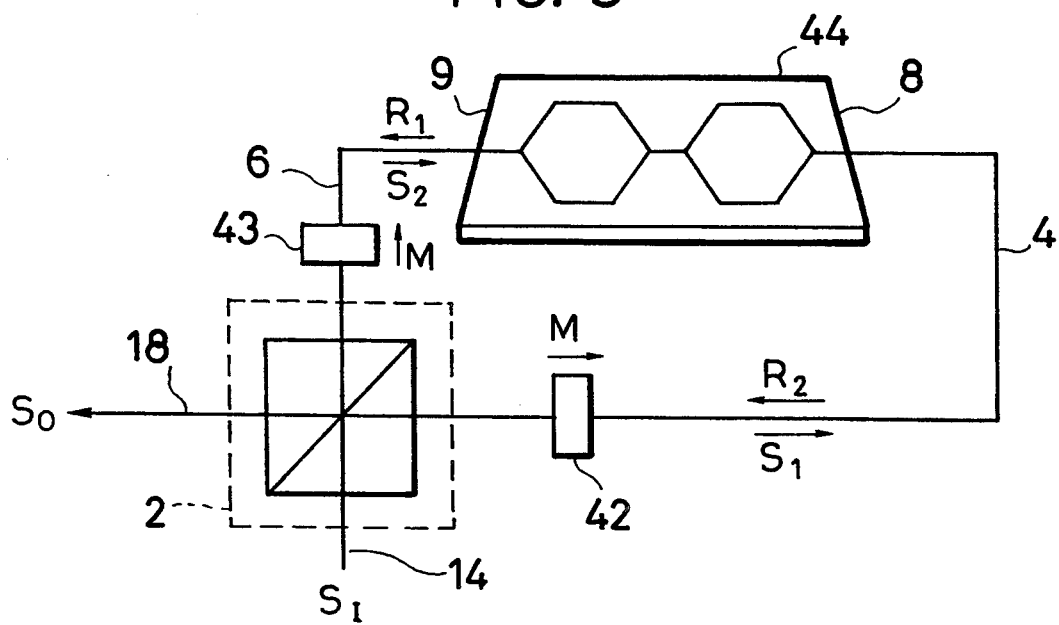
FIG. 9 is a schematic diagram of a sixth novel polarization-independent optical wavelength filter.

FIG. 9 shows a sixth novel polarization-independent optical wavelength filter. Elements common to FIG. 5 have the same reference numerals. Once again the polarization-dependent optical wavelength filter is a Mach-Zehnder 44, which is now tilted at forty-five-degree angle with respect to the page. Other than employing a different type of polarization-dependent optical wavelength filter, the filter in FIG. 9 operates exactly like the one in FIG. 5, so further description wilt be omitted.

Figure 10:
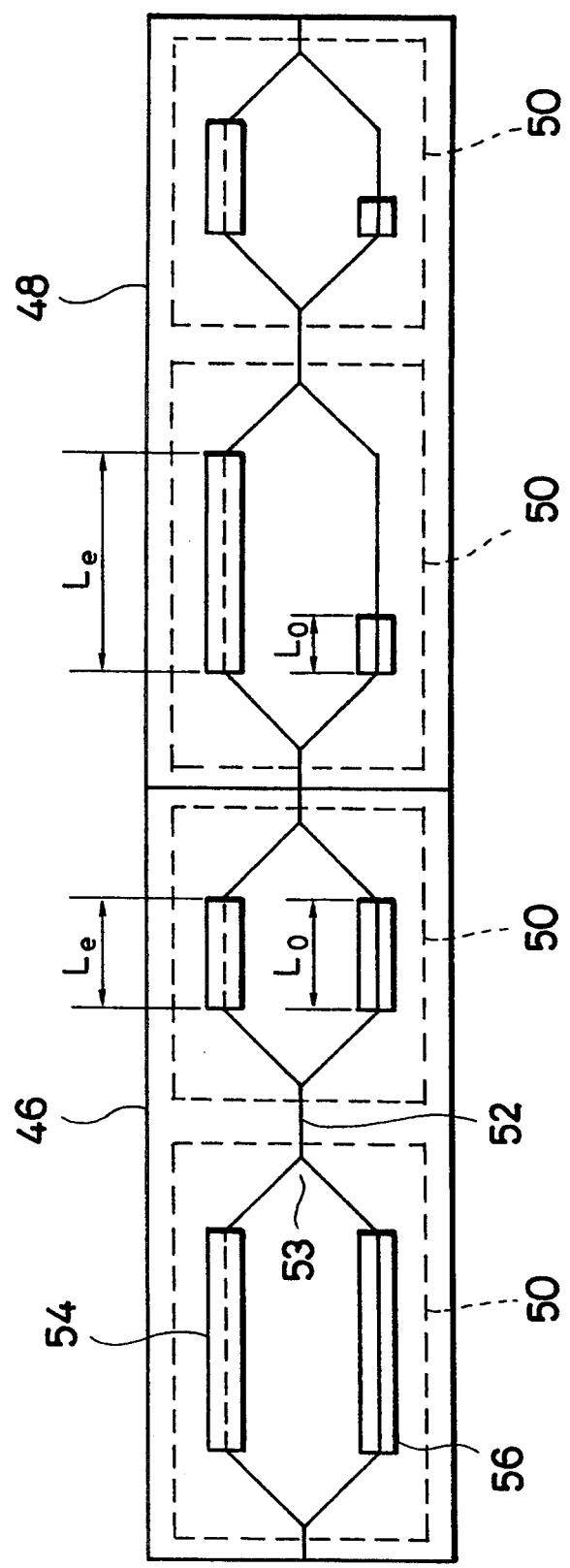
FIG. 10 is a schematic diagram of the Mach-Zehnder filter in FIGS. 8 and 9.

FIG. 10 shows an example of a Mach-Zehnder filter that can be employed in FIGS. 8 and 9. This filter comprises a cascaded pair of filters 46 and 48, each consisting of a cascaded series of Mach-Zehnder interferometers 50. In FIG. 10 each series has just two interferometers 50, but in general there may be more. Each Mach-Zehnder interferometer 50 comprises a waveguide 52 that branches at a Y-junction 53 into two parallel arms, which then rejoin. The upper arms are covered by electrodes 54; voltages applied to these electrodes 54 alter the index of refraction of the underlying waveguide 52. The lower arms have phase shifters 56 with, for example, indices of refraction that have been altered to create a structural optical path-length difference between the two arms.

The ratio of the length $L_e$ of the electrode 54 to the structural optical path length $L_o$ of the lower arm is the same for both interferometers 50 within each Filter 46 or 48, and this ratio differs between the two filters 46 and 48. The electrode lengths $L_e$ within each filter 46 or 48 form a doubling geometric progression, each electrode being twice as long as the previous one. The structural lengths $L_o$ accordingly also form a doubling geometric progression, increasing in the same direction as the electrode lengths $L_e$.

A Mach-Zehnder Filter with this structure will operate as described above, selecting a certain wavelength λ of TM-polarized light input at either end and rejecting other wavelengths. The selected wavelength λ depends on the voltage applied to the electrodes 54, so the filter can be tuned by varying this voltage. Tunability is an advantage of the Mach-Zehnder filter over the TE-TM converter structure shown in FIG. 2, in which the selected wavelength λ depends on the structural parameter Λ.

A Mach-Zehnder filter can also operate on TE-polarized light, in which case the selected wavelength will differ.

Figure 11:
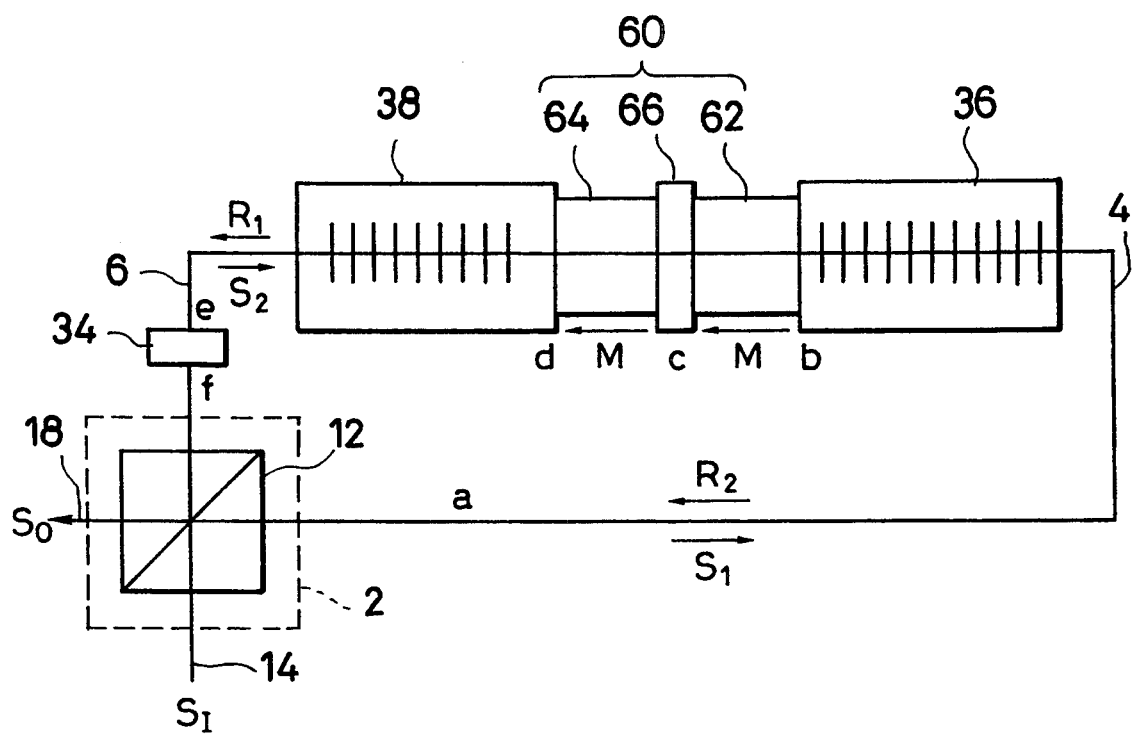
FIG. 11 is a schematic diagram of a seventh novel polarization-independent optical wavelength filter.

FIG. 11 shows a seventh novel polarization-independent optical wavelength filter. Elements common to FIGS. 4 and 5 have the same reference numerals; detailed descriptions will be omitted.

The input-output section 2 in FIG. 11 is identical to the one in FIG. 5. The second optical path 6 has a ninety-degree optical rotator 34.

The polarization-dependent optical wavelength filter in FIG. 11 comprises a pair of TE-TM mode converters 36 and 38 and a non-reciprocal polarizer 60. The non-reciprocal polarizer 60 comprises a pair of forty-five-degree Faraday rotators 62 and 64 with an ordinary polarizer 66 disposed between them. The magnetic field vectors M of the Faraday rotators 62 and 64 both point in the same direction; in the drawing they both point to the left. The polarizer 66 is oriented so as go block light with a plane of polarization tilted at a forty-five-degree angle to the page, the tilt being counterclockwise as viewed from the right in the drawing. Accordingly, the polarizer 66 passes light polarized at forty-five degrees clockwise to the surface of the page as seen from the right in the drawing.

The operation of this filter will be explained with reference to FIGS. 12 and 13, which show planes of polarization of signals at the points marked 'a' to 'f' in FIG. 11, as seen by an observer looking in the direction of propagation of the signals.

Figure 12:
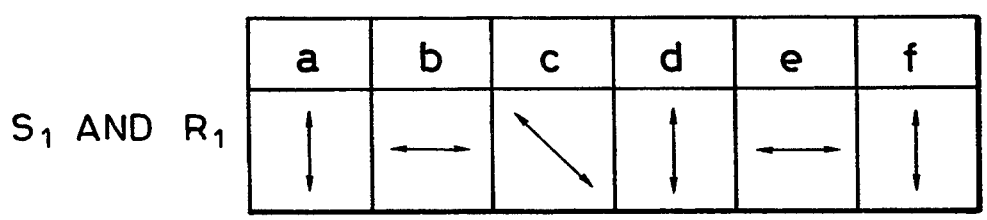
FIG. 12 illustrates planes of polarization at various points in FIG. 11.

Referring to FIG. 12, the first signal $S_1$ leaves the polarizing beam-splitter 12 with the TM polarization (a). The TE-TM mode converter 36 converts the λ wavelength component to the TE polarization (b). In the Faraday rotator 62, since the first signal $S_1$ is propagating in the direction to the magnetic field vector M, its plane of polarization is rotated forty-five degrees clockwise. The λ wavelength component thereby acquires the polarization (c) needed to pass the polarizer 66. Other wavelengths, being polarized in the orthogonal direction, are blocked by the polarizer 66. The λ wavelength component is rotated a further forty-five degrees clockwise in the Faraday rotator 64 and enters the TE-TM mode converter 38 as a TM signal (d), which the TE-TM mode converter 38 converts to the TE polarization state (e). Finally, the ninety-degree optical rotator 34 rotates the plane of polarization by ninety degrees, so that the first returning signal $R_1$ enters the polarizing beam-splitter 12 with the same polarization (f) as the first signal $S_1$ had (a) when it left the polarizing beam-splitter 12. The first returning signal $R_1$ is accordingly reflected to the output port 18.

Figure 13:
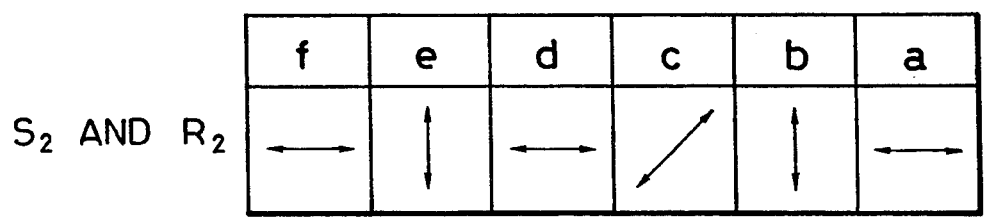
FIG. 13 likewise illustrates planes of polarization at various points in FIG. 11.

Referring to FIG. 13, the second signal $S_2$ is treated similarly, except that since it is propagating in the opposite direction to the magnetic field vectors M, the forty-five-degree rotations in the Faraday rotators 62 and 64 are counterclockwise (d-c-b). Once again, the λ wavelength component passes the polarizer 66 while other wavelengths are blocked. The second returning signal $R_2$ is polarized in the TE mode, hence passes straight through the polarizing beam-splitter 12 to the output port 18.

The directions of polarization (c) needed to pass the polarizer 66 appear different in FIGS. 12 and 13 because the polarizer 66 is being viewed from opposite directions.

Figure 14:
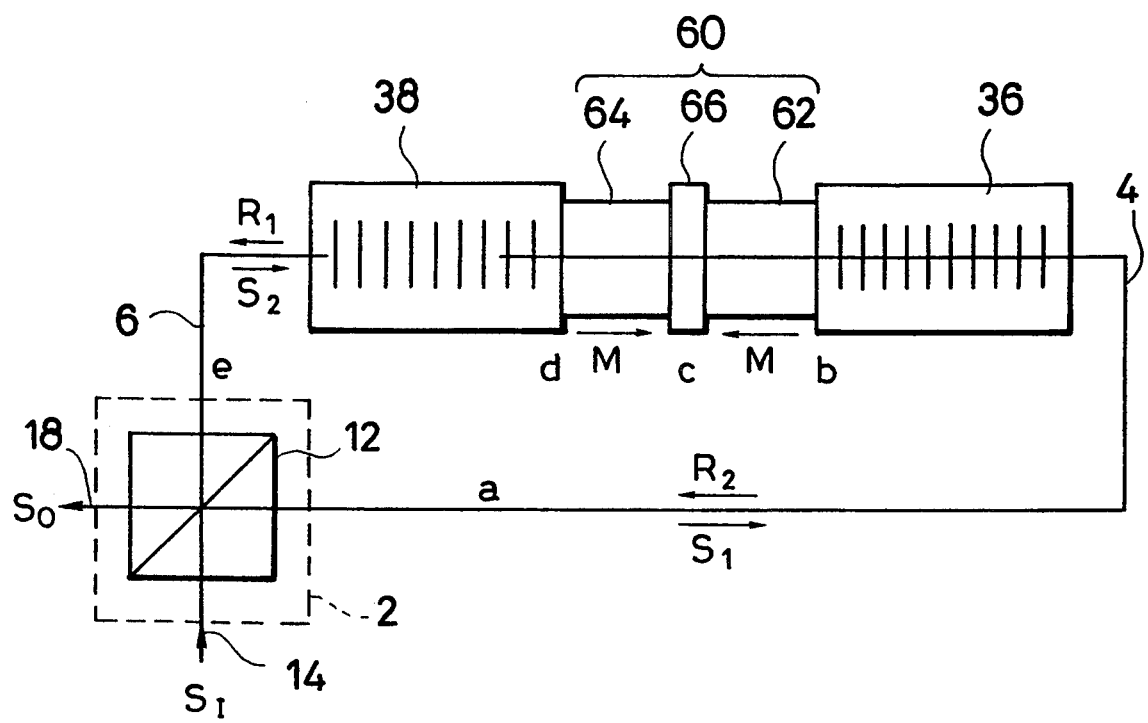
FIG. 14 is a schematic diagram of an eighth novel polarization-independent optical wavelength filter.

FIG. 14 shows an eighth novel polarization-independent optical wavelength filter. Elements common to FIG. 11 have the same reference numerals; detailed descriptions will be omitted. The only differences between FIGS. 11 and 14 are that the ninety-degree optical rotator 34 in FIG. 11 is omitted from FIG. 14, and the magnetic field vectors M of the forty-five-degree Faraday rotators 62 and 64 in FIG. 14 are oriented in opposite directions.

Figure 15:
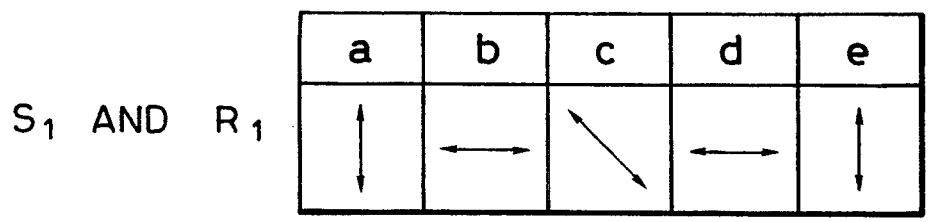
FIG. 15 illustrates planes of polarization at various points in FIG. 14.
Figure 16:
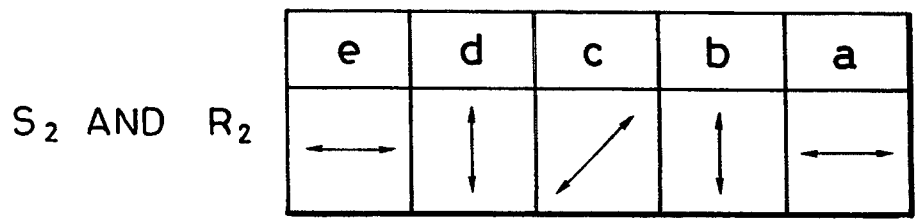
FIG. 16 likewise illustrates planes of polarization at various points in FIG. 14.

FIGS. 15 and 16 illustrate the operation of this filter.

Referring to FIG. 15, the first signal $S_1$ is rotated forty-five degrees clockwise in Faraday rotator 62 (b-c), so that its λ wavelength component passes the polarizer 66 (c), then is rotated forty-five degrees counterclockwise in Faraday rotator 64 (c-d). The effect of these two opposite rotations, and of the two TE-TM mode conversions in the TE-TM mode converters 36 and 38, is that the first returning signal $R_1$ reaches the polarizing beam-splitter 12 with the same polarization as the first signal $S_1$ had when it left. The first returning signal $R_1$ is therefore reflected to the output port 18.

Referring to FIG. 16, the second signal $S_2$ is rotated forty-five degrees clockwise in Faraday rotator 64 (d-c) and forty-five degrees counterclockwise in Faraday rotator 62 (c-b), with the same effect as described above. On returning to the polarizing beam-splitter 12, the second returning signal $R_2$ is polarized so as to pass straight through to the output port 18.

The filter in FIG. 14 provides the advantage of improved extinction ratio resulting from the use of two TE-TM mode converters 36 and 38 with the further advantage that no rotation of polarization is required on the first or second optical path 4 or 6, all necessary rotation being performed in the non-reciprocal polarizer 60.

The filters shown in the preceding drawings can be modified in various obvious ways. For example, instead of a polarizing beam-splitter 12 of the transmitting/reflecting type, another type of polarization splitter can be used, such as a polarization splitter comprising a pair of coupled waveguides or fibers. Waveguides can also be employed instead of fibers in the first and second optical paths 4 and 6. The ninety-degree optical rotator 34 in FIGS. 3, 4, 8, and 11 can be implemented as a half-wave plate with its principal axis tilted at a forty-five-degree angle to the page, instead of by twisting the fiber through ninety degrees. The sense of the forty-five-degree rotations shown in FIGS. 6, 7, 12, 13, 15, and 16 can of course be reversed from clockwise to counterclockwise and vice versa, by reversing the magnetic vectors M in FIGS. 5, 9, 11, and 14.

If wavelength tunability is desired, acoustic-optical TE-TM mode converters can be employed instead of the electro-optical type of mode converter shown in FIG. 2. The wavelength can also be altered by changing the dimension Λ in FIG. 2.

Those skilled in the art will recognize that still further modifications can be made without departing from the scope of the invention as claimed below.

What is claimed is:

1. A method of filtering an optical input signal ($S_I$) to extract a particular wavelength, comprising the steps of:
   using a polarization splitter (12) to divide said optical input signal into a first signal ($S_1$) and a second signal ($S_2$) which are linearly polarized with mutually perpendicular planes of polarization;
   leading said first signal via a first optical path (4) to a first end (8) of an optical device (7, 35, or 44,) that acts selectively on said wavelength;
   leading said second signal via a second optical path (6) to a second end (9) of said optical device;
   transmitting said first signal from said first end (8) to said second end (9) in said optical device, thus obtaining a first returning signal ($R_1$);
   transmitting said second signal from said second end (9) to said first end (8) in said optical device, thus obtaining a second returning signal ($R_2$);
   leading said first returning signal from said second end (9) to said polarization splitter (12) via said second optical path (6);
   leading said second returning signal from said first end (8) to said polarization splitter (12) via said first optical path (4); and
   recombining said first returning signal and said second returning signal in said polarization splitter (12), thereby generating an optical output signal ($S_0$).

2. The method of claim 1, wherein said optical device (7) rotates planes of polarization of components of said first signal and said second signal having said wavelength by ninety degrees.

3. The method of claim 2, comprising the further steps of:
   blocking light polarized perpendicularly to said first signal at the first end (8) of said optical device; and
   blocking light polarized perpendicularly to said second signal at the second end (9) of said optical device.

4. The method of claim 2, comprising the further step of rotating planes of polarization of said second signal and said first returning signal by ninety degrees on said second optical path (6).

5. The method of claim 1, wherein said optical device (35, 44) transmits said wavelength of light having a particular plane of polarization, and blocks other wavelengths of light having said particular plane of polarization.

6. The method of claim 5, comprising the further steps of:
   performing TE-TM mode conversion on said first signal and said second signal in said optical device (35);
   passing said first signal and said second signal through a polarizer (40) in said optical device; and
   performing another TE-TM mode conversion on said first signal and said second signal in said optical device (35).

7. The method of claim 5, comprising the further step of rotating planes of polarization of said second signal and said first returning signal by ninety degrees on said second optical path (6).

8. The method of claim 5, comprising the further steps of:
   rotating said first signal by forty-five degrees in a certain direction, as seen from said polarization splitter (12), on said first optical path (4);
   rotating said second returning signal by forty-five degrees in said direction, as seen from said polarization splitter (12), on said first optical path (4);
   rotating said second signal by forty-five degrees in said direction, as seen from said polarization splitter (12), on said second optical path (6); and
   rotating said first returning signal by forty-five degrees in said direction, as seen from said polarization splitter (12), on said second optical path (6).

9. The method of claim 8, wherein said direction is clockwise.

10. The method of claim 8, wherein said direction is counterclockwise.

11. The method of claim 1, wherein said optical device transmits, from said first end (8) to said second end (9), said wavelength of light having a particular plane of polarization, other wavelengths being blocked, and transmits, From said second end (9) to said first end (8), said wavelength of light having a plane of polarization perpendicular to said particular plane, other wavelengths being blocked.

12. The method of claim 11, comprising the further steps of:
   performing TE-TM mode conversion on said first signal and said second signal in said optical device;

passing said first signal and said second signal through a non-reciprocal polarizer (60) in said optical device; and performing another TE-TM mode conversion on said first signal and said second signal in said optical device.

13. A polarization-independent optical wavelength filter for selecting a particular wavelength from an optical input signal (S$_I$), comprising:

an input-output section (2) for splitting said optical input signal into a first signal (S$_1$) and a second signal (S$_2$) that are linearly polarized with mutually perpendicular planes of polarization, receiving a first returning signal (R$_1$) and a second returning signal (R$_2$) having mutually perpendicular planes of polarization, and recombining said first returning signal and a second returning signal into an optical output signal (S$_0$);

a TE-TM mode converter (20) having a first end (8) and a second end (9), for transmitting said first signal from said First end (8) to said second end (9) with ninety-degree rotation of plane of polarization at said wavelength, thereby generating said first returning signal, and transmitting said second signal from said second end (9) to said first end (8) with ninety-degree rotation of plane of polarization at said wavelength, thereby generating said second returning signal;

a first optical path (4) coupled to transmit said first signal from said input-output section (2) to said first: end (8) of said TE-TM mode converter (20), and said second returning signal from said first end (8) of said TE-TM mode converter (20) to said input-output section (2); and a second optical path (6) coupled to transmit said second signal from said input-output section (2) to said second end (9) of said TE-TM mode converter (20), and said first returning signal from said second end (9) of said TE-TM mode converter (20) to said input-output section (2).

14. The filter of claim 13, wherein said input-output section (2) comprises:

an optical gyrator for receiving said optical input signal; and a polarization splitter coupled to said optical gyrator, for splitting said optical input signal into said first signal and said second signal and recombining said first returning signal and said second returning signal to create said optical output signal.

15. The filter of claim 14, wherein said polarization splitter is a polarizing beam-splitter (12).

16. The filter of claim 14, wherein said optical gyrator is an optical circulator (10), which also outputs said optical output signal.

17. The filter of claim 14, wherein said optical gyrator is an optical isolator (33), said optical output signal being output from said polarization splitter.

18. The Filter of claim 13, wherein said first optical path (4) and said second optical path (6) are polarization-maintaining.

19. The filter of claim 18, wherein said TE-TM mode converter (20) has crossed polarizers (22, 24) disposed at said first end (8) and said second end (9), for blocking wavelength components of said first signal and said second signal having planes of polarization that were not rotated in transmission between said first end (8) and said second end (9).

20. The filter of claim 13, wherein said first optical path (4) is polarization-maintaining, and said second optical path (6), in transmitting said second signal and said first returning signal, rotates their planes of polarization by ninety degrees.

21. A polarization-independent optical wavelength filter For selecting a particular wavelength from an optical input, signal (S$_I$), comprising:

an input-output section (2) for splitting said optical input signal into a first signal (S$_1$) and a second signal (S$_2$) that are linearly polarized with mutually perpendicular planes of polarization, receiving a first returning signal (R$_1$) and a second returning signal (R$_2$) having mutually perpendicular planes of polarization, and recombining said first returning signal and a second returning signal into an optical output signal (S$_0$);

a polarization-dependent wavelength filter (35 or 44) having a first end (8) and a second end (9), for transmitting said wavelength of said first signal from said first end (8) to said second end (9) while blocking other wavelengths, thereby generating said first returning signal, and transmitting said wavelength of said second signal from said second end (9) to said first end (8) while blocking other wavelengths, thereby generating said second returning signal;

a first optical path (4) coupled to transmit said first signal from said input-output section (2) to said first end (8) of said polarization-dependent wavelength filter, and said second returning signal from said first end (8) of said polarization-dependent wavelength filter to said input-output section (2); and a second optical path (6) coupled to transmit said second signal from said input-output section (2) to said second end (9) of said polarization-dependent wavelength filter, and said first returning signal from said second end (9) of said polarization-dependent wavelength filter to said input-output section (2).

22. The filter of claim 21, wherein said input-output section (2) comprises a polarizing beam-splitter (12).

23. The filter of claim 22, wherein said input-output section (2) also comprises an optical circulator (10) for input of said optical input signal and output of said optical output signal.

24. The filter of claim 21, wherein said polarization-dependent wavelength filter (35) comprises:

a first TE-TM mode converter (36) disposed at said first end (8);

a second TE-TM mode converter (38) disposed at said second end (9); and a polarizer (40) disposed between said first TH-TM mode converter (36) and said second TE-TM mode converter (38).

25. The filter of claim 21, wherein said polarization-dependent wavelength filter (44) comprises cascaded Mach-Zehnder interferometers (50).

26. The filter of claim 21, wherein said polarization-dependent optical wavelength filter comprises:

a first TE-TM mode converter (36) disposed at said first end (8);

a second TE-TM mode converter (38) disposed at said second end (9); and a non-reciprocal polarizer (60) disposed between said first TE-TM mode converter (36) and said second TE-TM mode converter (38).

27. The filter of claim 26, wherein said non-reciprocal polarizer (60) comprises:
a pair of Faraday rotators (62, 64) for rotating planes of polarization of said first signal and said second signal by forty-five degrees, respectively, in identical directions; and
a polarizer (66) disposed between said pair of Faraday rotators (62, 64).

28. The filter of claim 26, wherein said non-reciprocal polarizer (60) comprises:
a first Faraday rotator (62) for rotating planes of polarization of said first signal and said second signal by forty-five degrees clockwise as seen from said first end (8) of said polarization-dependent optical wavelength filter;
a second Faraday rotator (64) for rotating planes of polarization of said first signal and said second signal by forty-five degrees counterclockwise as seen from said first end (8) of said polarization-dependent optical wavelength filter; and
a polarizer (66) disposed between said first Faraday rotator (62) and said second Faraday rotator (64).

29. The filter of claim 21, wherein said first optical path (4) and said second optical path (6) are polarization-maintaining.

30. The filter of claim 21, wherein said first optical path (4) is polarization-maintaining, and said second optical path (6), in transmitting said second signal and said first returning signal, rotates their planes of polarization by ninety degrees.

31. The filter of claim 21, wherein said first optical path (4) and said second optical path (6), when transmitting said first signal and said second signal, rotate their planes of polarization by forty-five degrees in identical directions as seen from said input-output section (2).

32. The filter of claim 31, wherein said identical directions are clockwise.

33. The filter of claim 31, wherein said identical directions are counterclockwise.

34. The filter of claim 31, wherein said first optical path (4) and said second optical path (6) comprise Faraday rotators (42, 43) for rotating said planes of polarization by forty-five degrees.

* * * * *